March 8, 1955 C. W. S. PARSONS 2,703,643
ARTICLE CONVEYING APPARATUS
Filed May 12, 1951 6 Sheets-Sheet 1
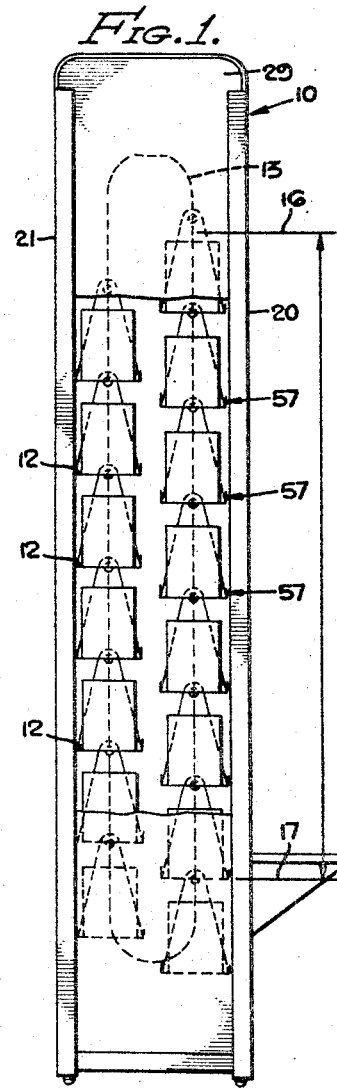
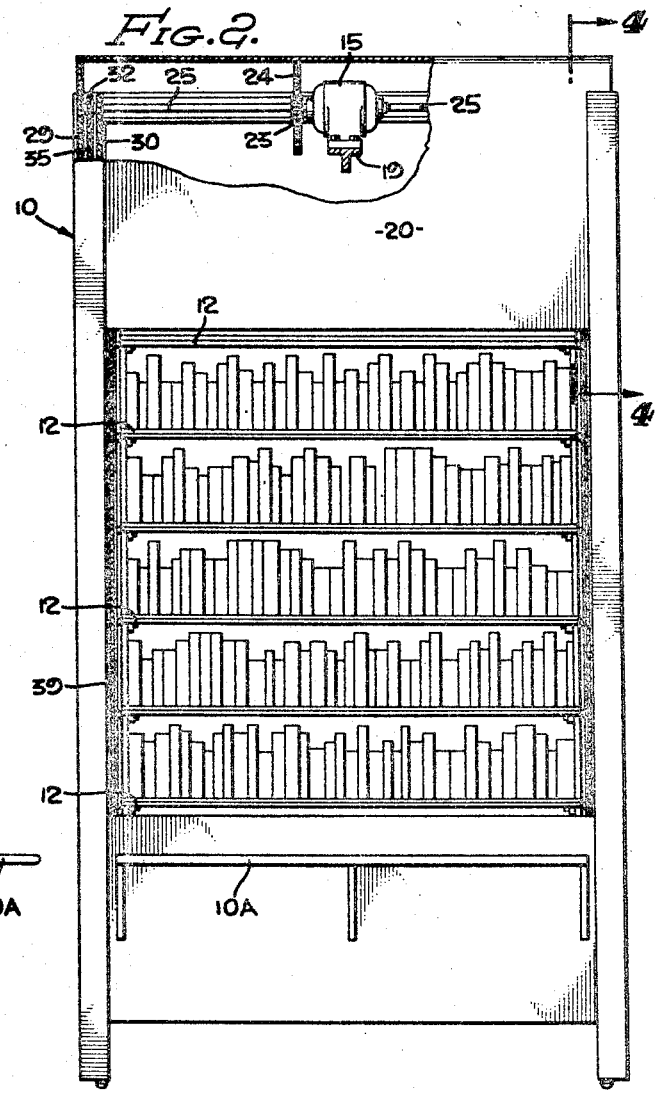
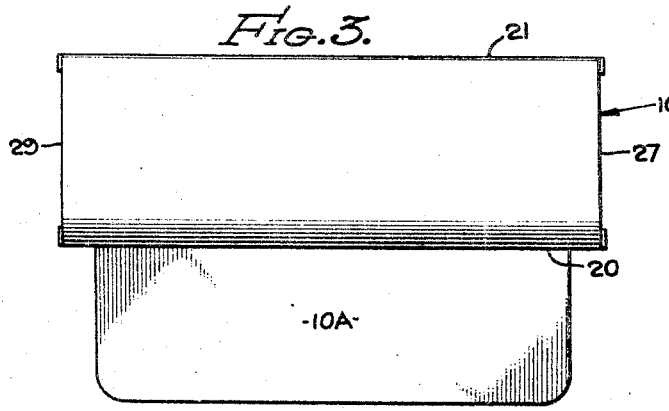
CHARLES W. S. PARSONS
INVENTOR.
BY
ATTORNEYS March 8, 1955  C. W. S. PARSONS  2,703,643
ARTICLE CONVEYING APPARATUS
Filed May 12, 1951  6 Sheets-Sheet 2
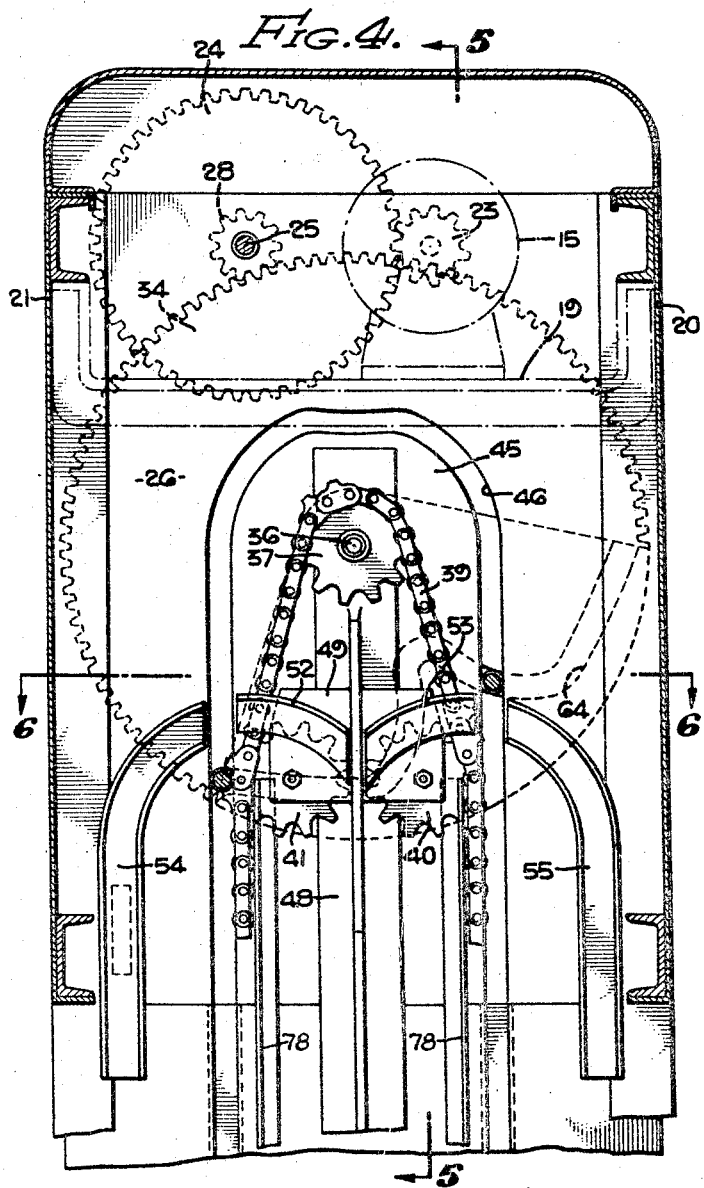
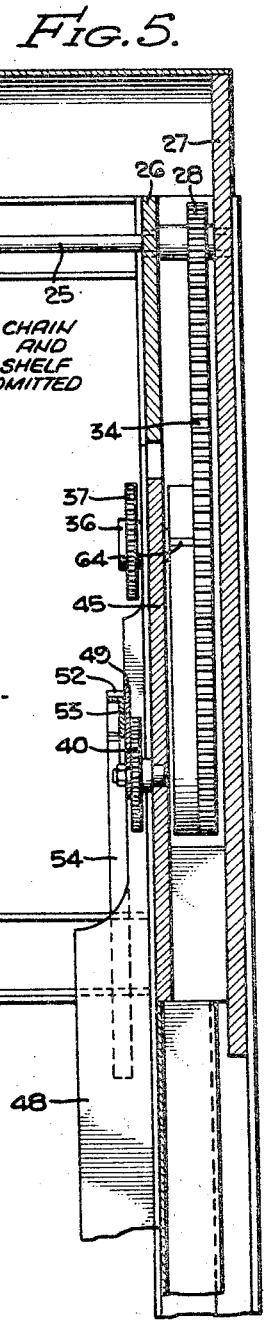
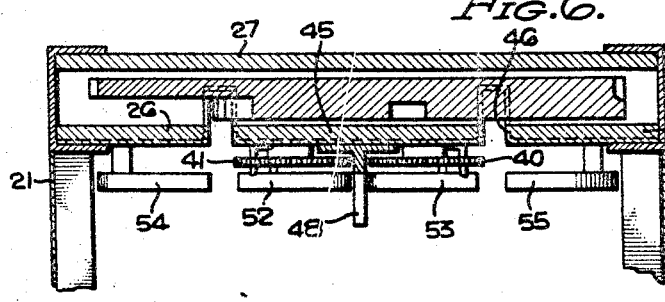
INVENTOR.
CHARLES W. S. PARSONS
BY
Lyon & Lyon
ATTORNEYS

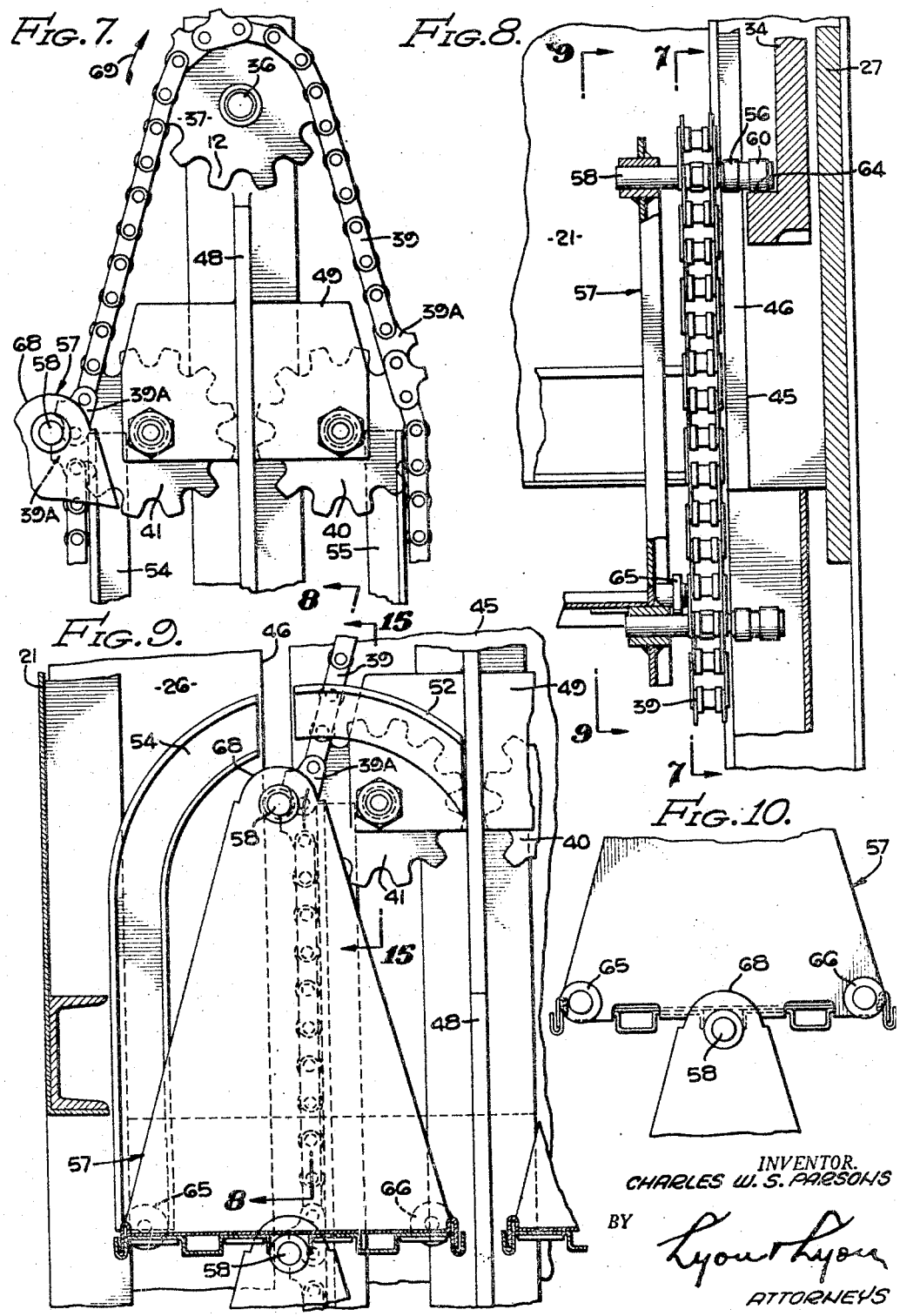

INVENTOR.
CHARLES W. S. PARSONS
BY
Lyon Lyon
ATTORNEYS

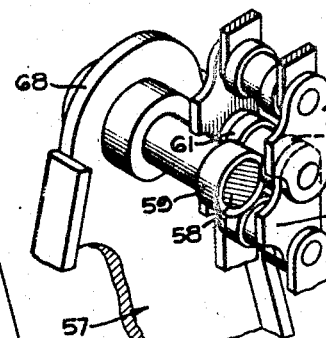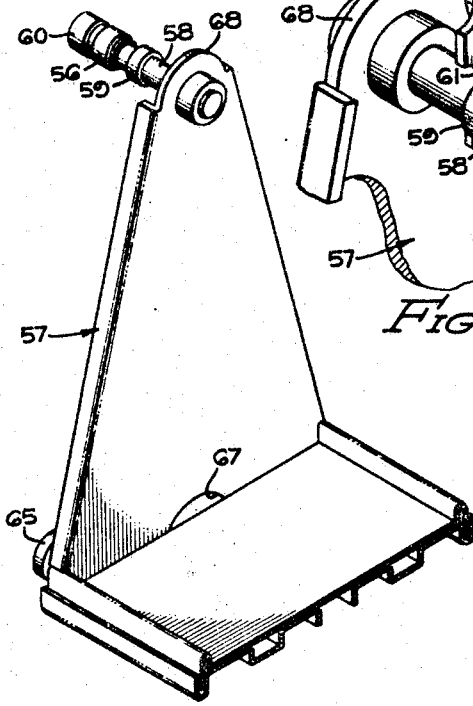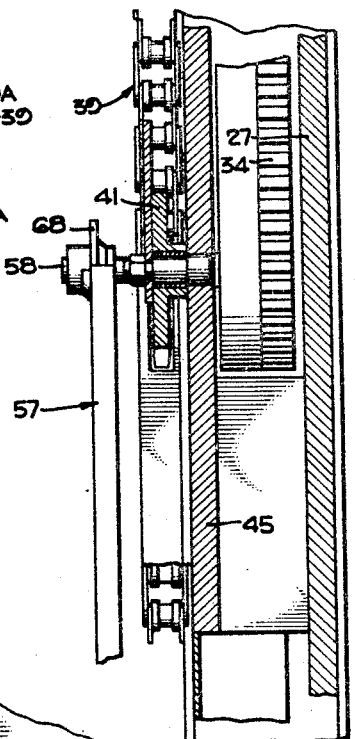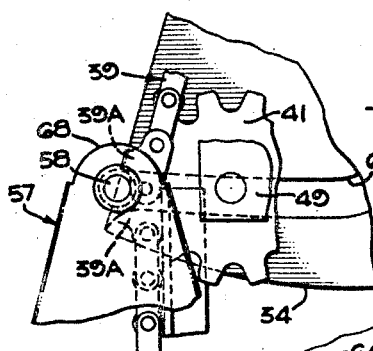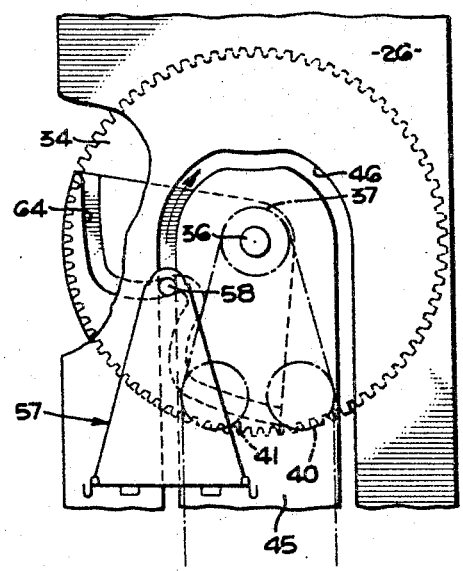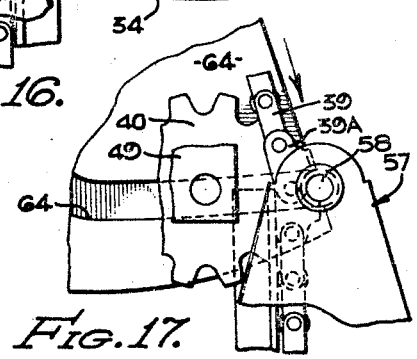

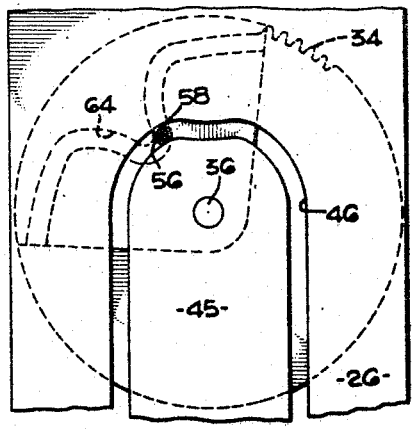
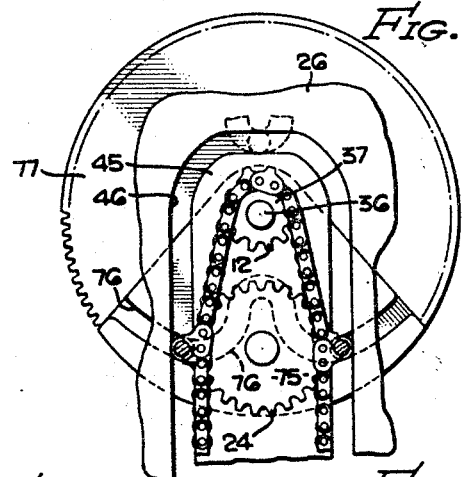
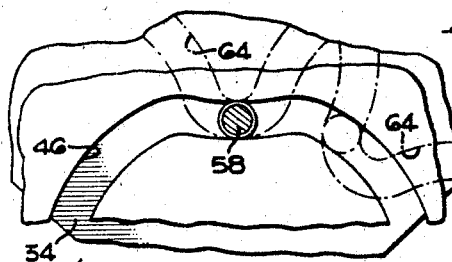
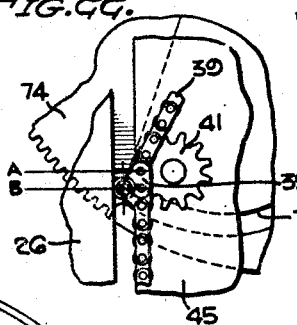
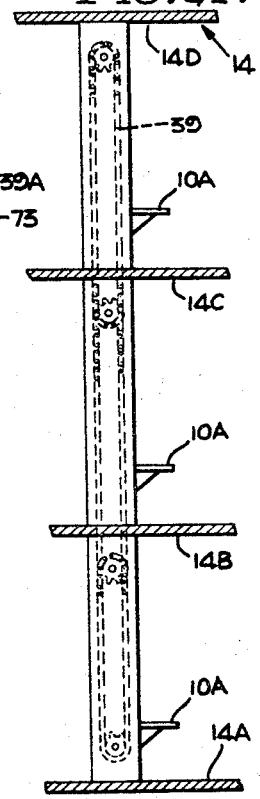
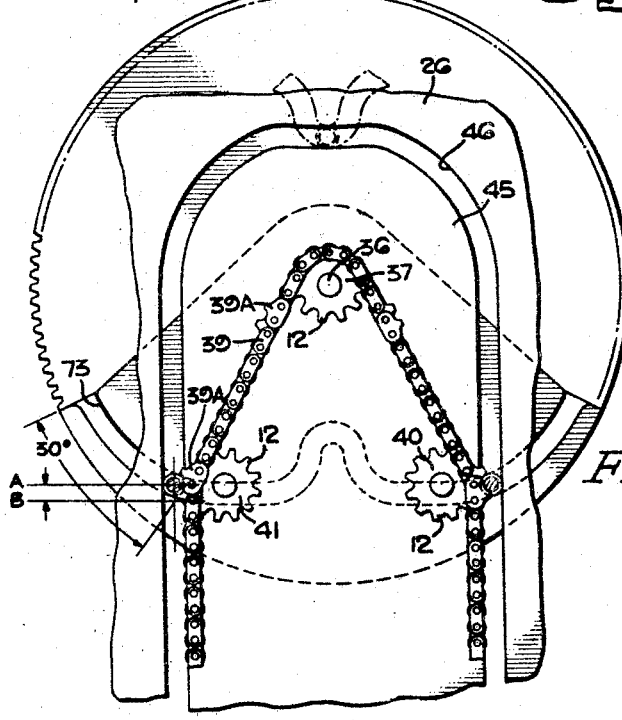

United States Patent Office 2,703,643
Patented Mar. 8, 1955

2,703,643

ARTICLE CONVEYING APPARATUS

Charles W. S. Parsons, Beverly Hills, Calif.

Application May 12, 1951, Serial No. 226,042

2 Claims. (Cl. 198—137)

The present invention relates to improvements in equipment or structures containing moving or movable storage or display units comprising shelves, racks, trays, bins, drawers, boxes or other receptacles hereinafter referred to generally as shelves or carriers.

This invention relates to improvements in equipment or structures with moving or movable shelves or carriers put to uses such as bookcases or racks, display cabinets or shelving, filing units, auto storage units, or any other uses for which this character of apparatus is applicable.

One object of the present invention is to provide improved apparatus of this character in which the shelves or carriers may be easily moved to different accessible positions.

Another object of the present invention is to provide improved article carrying apparatus of the character usable as fixed or movable bookcases, display racks, storage shelving units and the like, with shelves or carriers which, by hand or by power, as by electric motor with standard controls, may be brought to eye or hand level for loading, unloading, inspection or other purposes.

Another object of this invention is to provide improved apparatus of this character embodying such construction that it is attached to or made a part of a building, and may extend to any appropriate height in one or more stories of such building, and containing such mechanism as provide that shelves or carriers are movable between all floors, and that particular shelves or carriers may be made accessible on any floor.

Another object of the present invention is to provide an improved set of moving or movable shelves or carriers of this character featured by the incorporation of unique mechanisms for accomplishing these general purposes.

Another object of the present invention is to provide an improved method of handling books and other objects, of this character, featured by the fact that more such books or objects may be stored in a given space, that available headroom may be better utilized, and that access to the books or other objects may be gained more efficiently.

Another object of the present invention is to provide improved apparatus of this character which is compact, so that moving shelves or carriers, fully loaded, may require a minimum clearance space between the tops of fully loaded shelves or carriers and the bottom of those moving above them in the same or opposite directions, depending upon whether the main direction of travel of the conveyor is vertical, horizontal or inclined.

Another object of this invention is to provide improved apparatus of this character which makes it possible to operate moving shelves or carriers supported on opposite runs of the conveyor with minimum clearance either directly between them or allowing them to pass within a small part of an inch by any shafts, braces, sheets, plates or other structural members required in the construction of said apparatus; in other words, width, or effective height of shelves or carriers, in this invention, does not act to require the marked spacing apart of said shelves or carriers as they follow one another on one run of the conveyor, or as they pass each other while supported on opposite runs of the conveyor.

Another object of this invention is to provide improved apparatus of this character which makes it possible to build shelves or carriers of any length, limited only by reasonable regard for structural design and economic considerations.

The features of the present invention which are believed to be novel are set forth with particularity in the appended claims. This invention itself, both as to its organization and manner of operation, together with further objects and advantages thereof, may best be understood by reference to the following description taken in connection with the accompanying drawings in which:

Figure 1 is a view in side elevation of one form of this invention, an improved bookcase of a movable type embodying features of this invention, with a portion of the apparatus including the shelves shown in schematic form;

Figure 2 is a front view of the same with the upper portion broken away to show internal structure;

Figure 3 is a top plan view of the same;

Figure 4 is a sectional view taken substantially on the line 4—4 of Figure 2; this view is particularly important as revealing a unique and novel feature of a transfer mechanism, in that the center of cam rotation may be at any height preferred above the point where the conveyor changes direction from its main run;

Figure 5 is a sectional view taken substantially on the line 5—5 of Figure 4;

Figure 6 is a sectional view taken substantially on the line 6—6 of Figure 4;

Figure 7 is an enlarged view of the sprockets shown in Figure 4 and corresponds generally with a section taken on the line 7—7 of Figure 8;

Figure 8 is a sectional view taken substantially on the line 8—8 of Figure 9;

Figure 9 is a sectional view taken substantially on the line 9—9 of Figure 8;

Figure 10 is an end view of the shelving indicating a manner in which the individual shelves may be articulated and interlocked to prevent undue lateral movement;

Figure 13 is a perspective view of a portion of one design of shelf;

Figure 14 is a perspective view showing conveyor chain in relation to shelf or carrier trunnion, the latter being cut away to show lugs formed on chain links to support trunnion;

Figure 15 is a sectional view taken substantially on the line 15—15 of Figure 9;

Figure 16 is a diagrammatic view of the cam slot in the rotary wheel of one top transfer mechanism, and a portion of shelf and trunnion during the period of initial cam loading or of final unloading;

Figure 17 is a view similar to that shown in Figure 16 but on the opposite side of the transfer mechanism where the conveyor chain is indicated to be travelling generally downward; the shelf trunnion is therefore just unloading from the cam;

Figure 18 is a diagrammatic view of a cam and shelf in one of the intermediate positions while the shelf is being transferred, in this case from left to right, from the up-travelling to the down-travelling run of the conveyor chain, as indicated by the arrow on the drawing;

Figures 19 and 20 are views similar to the view shown in Figure 18, with shelf and transfer mechanism related, but in these cases in different operating positions;

Figure 21 shows a modified form of shelf transfer mechanism, this view indicates that loading shelves or carriers on a conveyor, and unloading them, by a transfer mechanism take place at the same time, although the times may be different as controlled by variations in the design of the transfer mechanism;

Figure 22 is a view similar to Figure 21 but with the parts in different operating positions;

Figure 11:
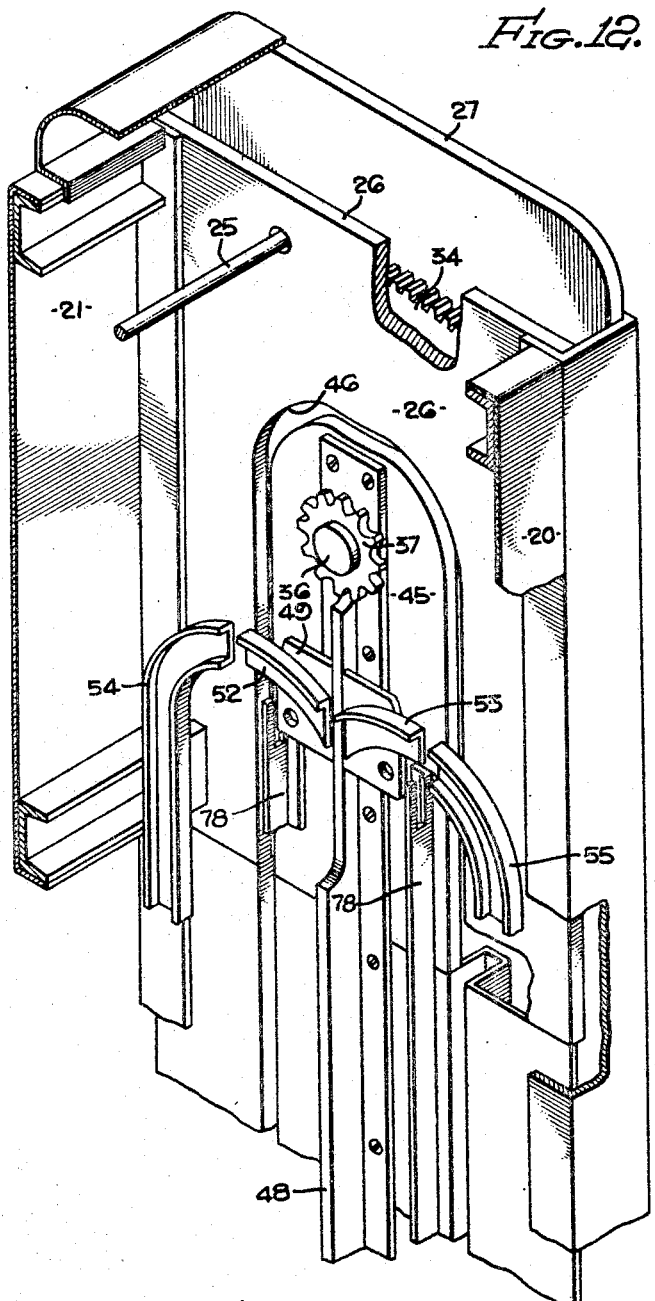
Figure 11 is a perspective view of a portion of one of the top end frames.

Figure 23 is a view similar to the view shown in Figure 21, but with a second modification useful in certain instances; for example, with shelves that are relatively narrow from front to back, the two idler sprockets of Figure 21 may be replaced by a single larger sprocket; and Figure 24 is a diagrammatic view showing the manner in which the apparatus shown in previous figures may be incorporated in a multistory building.

As seen in Figures 1 and 2, this invention consisting of article conveyor apparatus, portrayed in the form of a movable bookcase, includes a frame 10 with a plurality of movable shelves 57 which move in the path indicated by the dotted line 13. The frame may include a stationary or folding ledge 10A. As shown in Figure 24, said apparatus may in fact extend substantially the full height of a building with more than one story, depicted building structure 14 having floors 14A, 14B and 14C and a ceiling 14D. For purposes of explaining the present invention, it is shown specifically in the form shown in Figure 2 wherein an electric motor 15 is utilized to effect movement of the shelves or carriers 12 in their orbital path 13.

Briefly, opposite ends of each shelf or carrier in the greater part of its main direction of movement, in this case vertical in the space between horizontal lines 16, 17 in Figure 1, are carried and moved according to well established practice by endless chains which are synchronized and parallel with their respective sprockets having common axes and operable in unison in either direction. Near the opposite ends of said main directional movement, however, special transfer mechanisms are provided which incorporate important novel features of the present invention. The purpose of these transfer mechanisms is to carry the shelves into and around the curved end portions of their orbital path 13 picking up said shelves without jar at the speed of the ascending chains and accelerating them at such speeds as are necessary to effect transfer without interference between shelves when fully loaded, as is graphically indicated in Figures 4, 19, 21 and 23. To effect transfer of shelf or carrier trunnion without jar between conveyor and cam slot 64, as in Figures 16, 18 said slot enters rotary gear wheel 34 substantially tangentially thereof, curving toward a radial relation therewith, the slot engaging said trunnions of carriers successively as they are brought to pick up position by the conveyor chain. It is understood that in this application "substantially" is modified to mean that point of contact of cam with carrier trunnion, at instant of pick up and at instant of delivery of trunnion back onto conveyor chain, in its component of movement in line with main direction of conveyor chain, has the same speed as the chain.

As may be noted in the above drawings, and as will be described in more detail later, the particular improvement over prior transfer mechanisms lies in the fact that a shelf or carrier is picked up and moved vertically as far as necessary before being moved in some transverse path having a horizontal component, such as one that is approximately part of a circle, to bring a shelf or carrier into position to move downward in main directional movement. This extra vertical movement in vertical direction, as shown on the drawings, makes it possible to have shelves or carriers of any desired combination of width and height. In this case, the shelf or carrier width is nearly equal to the horizontal distance between vertical center lines of shelves or carriers on up and down strands of aforesaid endless chains. In this case, shelf or carrier height is substantially the same as the vertical distance between floors of successive shelves or carriers.

The motor 15, as shown in Figures 2 and 4, is supported on a laterally extending frame member 19, which has its opposite ends affixed to the front and back walls 20, 21 of the frame. As shown, the output shaft of the motor 15 mounts the driving pinion 23 which is in constant mesh with the larger gear 24 mounted on rotatable shaft 25, the opposite ends of the shaft 25 being rotatably supported as indicated in Figures 2 and 5 in the spaced stationary frame walls 26, 27 and 29, 30, with driving pinions 28, 32 being in constant mesh with much larger gears 34 and 35. These larger gear wheels are rotatably supported as illustrated in Figure 5. Specifically, the gear 34 is mounted firmly on the shaft 36, which is rotatably supported on the inner and outer frame walls 26, 27, and carries a chain sprocket wheel 37 over which, as shown in Figure 4, an endless flexible chain 39 passes and is driven thereby.

Figure 12:
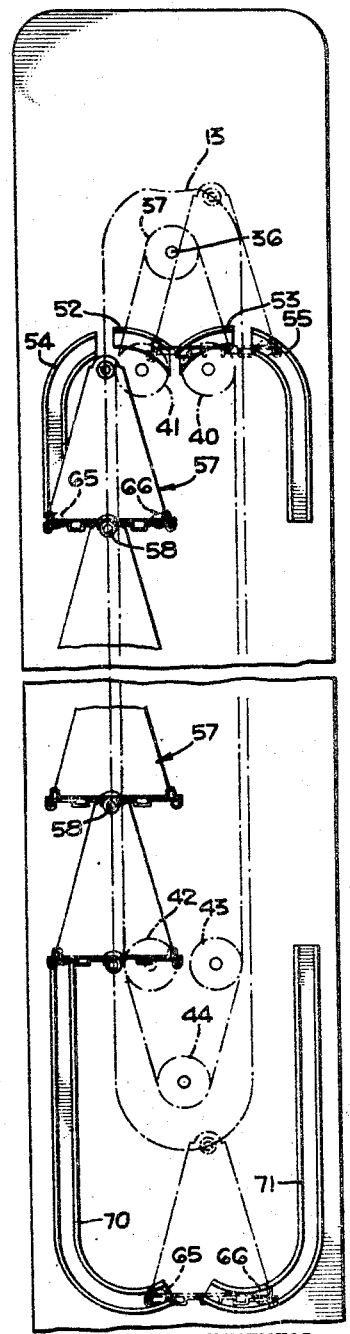
Figure 12 is a view partly in structure and partly in diagrammatic form of the tracks which form shelf guides during transfer of shelves between conveyor runs.

The movement of chain 39 is directed by the pair of idler sprocket wheels 40, 41 at the upper end, and the three triangularly disposed lower sprocket wheels 42, 43, 44, Figure 12. These lower sprocket wheels 42, 43, 44 are mounted in a manner similar to the manner in which the upper sprocket wheels 37, 40 and 41 are mounted, and in such manner as is shown in perspective in Figure 11.

It is understood that the drive, beginning with motor 15 and including the train of shafts and pinions up to gears 34, 35, may in effect be mounted at the bottom of the apparatus instead of at the top, or at either end in the case of apparatus whose main direction of conveyor chain movement is horizontal or inclined.

It is further understood that shafts corresponding to shaft 36 of Figures 5 and 11, together with the shaft having a common axis with shaft 36, but placed on the drive train to the chain at the other ends of the shelves, aforesaid shafts being at the lower part of the apparatus, in line with sprocket wheel 44 in Figure 12, for example, may be cross-connected from side to side as one shaft, in order better to maintain conveyor chains on opposite sides in complete synchronism. If the drive is at the bottom, the same may obtain. If the general direction of movement of the chains is horizontal or on an incline, a similar condition may prevail.

It is further understood that in lieu of the arrangement of motor and gear train shown in Figures 2 and 4, any other appropriate and commonly available mechanical or other drive, including the use of chains or belts, may be utilized.

In Figure 11 the shaft 36 extends through the stationary inside plate 45, the outer peripheral edge of which is spaced an appropriate distance from the adjacent edge of inner frame wall 26 to define the guide groove 46. The vertical length of guide groove 46 as measured by the height of the axis of shaft 36, Fig. 4, above the axes of pinions 40 and 41, represents a key structural feature in the transfer mechanism, in that the center of rotation defining the substantially circular part of groove 46 is high enough above the point where the endless chain breaks away from vertical movement to make it possible to supply any necessary combination of width and height of shelves or carriers, yet to operate them compactly vertically and compactly as between shelves or carriers on oppositely moving strands of endless chains. Whereas Figure 11 and other figures do show endless chains, it is understood that in general terms they are herein also described as an endless conveyor. This plate has affixed thereto the T-shaped frame member 48 which serves as a strut between plate 45 and the corresponding plate at the lower end of the structure. The apertured plate 49 serves as a spacer between the ends of stub shafts which carry idler sprocket wheels 40, 41, and also acts as support for guide tracks 52, 53. Angle members 78, Figures 4 and 11 extend from plate 45 to the corresponding plate at the lower end of the structure, serving as guides to maintain the chain in its proper main direction of travel and to prevent it from failing to support the shelves. The slots at the ends of the angle members provide for the passage of sprocket wheels 40, 41, 42, 43 (Figure 12 and Figure 7) and for the smooth continuance of chain and shelves in their proper main direction of travel.

The channel shaped guide track sections 52 and 53 are continuations of tracks 54 and 55, respectively, as shown in Figure 11, and all of them have curvature corresponding substantially with that of the groove 46. In a modified form of construction, at the bottom of the apparatus, either track 70 or 71 may be continued upward obviating the need for either 71 or 70.

As the shelves pass from engagement with the chains, the grooves 46 are engaged by rollers 56, as shown in Figure 13, rotatably mounted at each end of each shelf member 57, on stationary trunnion shafts 58. The trunnion shafts 58 may as an alternate be made one continuous shaft extending between the opposite ends of shelf member 57.

Also mounted on each shelf trunnion shaft 58, as in Figure 13, is a cam roller 60. The part of trunnion shaft 58 marked 59, as shown in Figure 14, rides in the grooves of chain rollers 61 during the time the shelf is moving along with the chain in its main direction of travel. As is more clearly shown in Figure 7, the smaller diametered portions of trunnion shaft 58, on each side of the part marked 59 in Figure 14, are engaged by lugs extending from the link plates 39A of the chain, which support or guide the shelves in their movement during the time they move along with the conveyor chain in its main direction of travel. The groove roller 56 (Figure 13) is always disposed within the guide groove 46 (Figure 11) while the cam track roller 60, which serves an important useful purpose at both ends of main shelf travel, when the shelf is actually taken off the chain, is at such times engaged in the cam slot 64 (Figures 19 and 8) formed on the inner face of the wheel or disc on whose periphery is gear 34, or similarly formed on the inner face of the wheel or disc comprising part of the driven transfer mechanism at the lower or opposite end of the chain. The shelf 57 also mounts at one or both ends near its base one or both of a pair of rollers 65, 66 (Figures 13 and 9) which rides or ride in channel shaped guide tracks such as 52, 53, 54 and 55 during the transfer of the shelf from the part of the chain going in one main direction of travel to the part going in the opposite direction.

It is noted that the lower end of the shelf 57 is notched at 67 (Figure 13) to provide a complementary recessed portion for the rounded upper end 68 of the next lower shelf, such portions 67, 68 cooperating to allow pivotal movement between the shelves but to limit lateral movement. The chain 39 may be driven in either direction; if in a clockwise direction as indicated by the arrow 69 (Figure 7) the shelves on the left (Figure 7) are carried upward by endless chain 39, as indicated previously, by the lugs 39A. Near the upper end of main directional travel, as shown in Figure 7, due to the triangular positioning of the sprocket wheels 37, 41 and 40, the chain 39, as it passes over the sprocket wheel 41, is inclined angularly away from the vertical to allow disengagement of shelf trunnion 58, at which time it is supported as shown in Figure 16 by cam slot 64 of the rotary gear wheel 34. Similar action takes place at the lower end of the portion of the endless chain 39 which is going in a downward direction, as in Figures 7 and 12. It is understood that the same principle obtains in apparatus of this character in which the main general direction of travel of the endless chain is horizontal or at an incline.

Further clockwise rotation of the gear 34 from the position shown in Figure 16 results in the shelf 57 being completely separated from engagement with the chain 39 and its triangular generally lateral movement in its passage around sprocket wheel 37 (Figure 7), the upper portion of the shelf, however, at all times being guided in such movement by engagement of the groove roller 56 with the walls of the groove 46, so that eventually the condition shown in Figure 17 is realized wherein the cam roller 60 leaves the slot 64 and the shelf trunnion shaft 58 (Figure 13) is again engaged by the lugs on chain link plates 39A on the endless chain 39.

It should be noted that in the construction of the cam, shown as cam slot 64, Figures 16, 17, it may not be necessary to provide walls on both sides of said slot throughout the length of the cam, since bearing by cam roller 60 during part of its traverse is only on one side of the slot.

During this transitional period depicted progressively by Figures 16, 18 and 17, the shelf roller 65 (Figure 9) leaves the track 54 (Figure 11) and the other shelf roller 66 enters and is guided by the roller track 53, 55. By this means the shelves are stabilized in this transitional movement from contact with the part of the chain going in one direction to contact with the part of the chain going in the opposite direction. It should be noted also that as an alternate construction shelf rollers 65 and 66 may be located at opposite ends of the shelf, with the track guides correspondingly disposed.

While the transfer mechanism at the upper or opposite end of the chain 39 is described above in detail, it is understood that the mechanism for effecting such transfer at the lower end of the chain is substantially the same, although there are some differences in the shape of the roller tracks 70, 71 (Figure 12), which correspond to the roller tracks 54, 52 on the one hand, and 53, 55 on the other. The difference in construction resides in the fact that the lower ends of tracks 70, 71 need not be interrupted to allow passage of shelf trunnion shaft 58, as is the case at the upper end. It is noted that at the lower end during the transitional period the roller 60 on carrier trunnion 58 is engaged in a cam slot, similar to cam slot 64, on the face of a disc mounted for rotation synchronously with the lower idler gear 44 and this structure is similar to the structure of the cam portion of gear 34 at the upper end, except that in the upper construction, in the region of zero vertical travel of the shelf, and near the high point of travel in an apparatus of this character with generally vertical or inclined movement of the endless chain, the orbital path 13, Figure 1, may be flattened, with appropriate blending curves as shown in the groove 46 of Figure 18, whereas at the lower end the cam slot may not require this.

The arrangement shown in the modified form in Figures 21 and 22 is essentially the same as shown in the previous figures; however, the shape of the cam slot 73 (comparable with cam slot 64 in gear wheel 34) is somewhat different to assure entrance of the roller 60 on carrier trunnion 58 in slot 73 well before trunnion 58 is disengaged from chain lugs 39A (Figure 14). Thus in Figure 21 it is observed that the gear 74 (comparable with gear 34, Figures 5, 11 and 18) has moved an angular distance of approximately 30° before the shelf is moved completely out of engagement with chain 39.

The invention is also incorporated in somewhat modified form in Figure 23, wherein the two idler wheels 40, 41 previously described (Figures 4 and 7) are replaced by a single idler sprocket wheel. In such instance the cam slot 76 in the face of the gear 77, comparable with gear 34, serves to effect transfer of the shelf from the upward to the downward moving part of the endless chain 39.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In article conveying apparatus, an endless conveyor formed with a series of carrying lugs, carriers each formed with a trunnion engaged by a lug and carried thereby, a support formed with an endless groove for guiding the trunnions of the carriers; a transfer mechanism for transferring the carriers from one run of the conveyor to the other run thereof, said transfer mechanism comprising a rotary wheel formed with a cam slot, said slot entering said wheel substantially tangentially thereof and curving toward a radial relation therewith, said slot engaging said trunnions of said carriers successively to lift the same off said conveyor lugs and actuate the carriers while guided by the end portion of the endless groove to transfer the carriers successively to said other run of the conveyor; means for guiding said conveyor in a path parallel to said endless groove up to the point of transfer, and further guide means for guiding said conveyor away from said point of transfer from one run of the conveyor to withdraw the conveyor from a carrier and then guiding the conveyor to the point where said transfer wheel returns the carrier to a lug on the other run of the conveyor.

2. Article conveying apparatus as set forth in claim 1 wherein said further guide means is disposed between said one run of the conveyor and said other run of the conveyor, said conveyor being deflected angularly away from said point of transfer and then deflected angularly to said point of return of the carrier.

References Cited in the file of this patent

UNITED STATES PATENTS

| | | |
|---|---|---|
| 893,563 | Basler | July 14, 1908 |
| 1,269,414 | Fitterling | June 11, 1918 |
| 1,859,874 | James | May 24, 1932 |
| 1,865,596 | Starks | July 5, 1932 |
| 1,959,926 | Reich | May 22, 1934 |
| 2,268,862 | Ellis | Jan. 6, 1942 |
| 2,315,790 | Hallwood | Apr. 6, 1943 |
| 2,414,164 | Nalbach | Jan. 14, 1947 |

FOREIGN PATENTS

| | | |
|---|---|---|
| 288,099 | Germany | Oct. 12, 1915 |